United States Patent
Malmborg (10) Patent No.: US 10,793,943 B2
(45) Date of Patent: Oct. 6, 2020

(54) METHOD OF PRODUCING A GAS TURBINE ENGINE COMPONENT

(71) Applicant: United Technologies Corporation, Farmington, CT (US)

(72) Inventor: Eric W. Malmborg, Amston, CT (US)

(73) Assignee: Raytheon Technologies Corporation, Farmington, CT (US)

(*) Notice: Subject to any disclaimer, the term of this patent is extended or adjusted under 35 U.S.C. 154(b) by 79 days.

(21) Appl. No.: 15/922,230

(22) Filed: Mar. 15, 2018

(65) Prior Publication Data
US 2019/0284675 A1    Sep. 19, 2019

(51) Int. Cl.
| | |
|---|---|
| *B33Y 10/00* | (2015.01) |
| *F01D 5/14* | (2006.01) |
| *F01D 5/16* | (2006.01) |
| *F01D 5/20* | (2006.01) |
| *C23C 4/134* | (2016.01) |
| *B23K 10/02* | (2006.01) |
| *B23P 15/02* | (2006.01) |

(Continued)

(52) U.S. Cl.
CPC ............ *C23C 4/134* (2016.01); *B23K 10/027* (2013.01); *B23P 15/02* (2013.01); *C23C 4/08* (2013.01); *F01D 5/147* (2013.01); *F01D 5/28* (2013.01); *B23K 2101/04* (2018.08); *B33Y 10/00* (2014.12); *B33Y 80/00* (2014.12); *F05D 2230/30* (2013.01); *F05D 2230/312* (2013.01); *F05D 2230/42* (2013.01); *F05D 2250/291* (2013.01); *F05D 2300/133* (2013.01)

(58) Field of Classification Search
CPC . C23C 4/134; C23C 4/08; C23C 4/073; B23P 15/02; B23K 10/027; B23K 2101/04; F01D 5/147; F01D 5/148; F01D 5/16; F01D 5/20; F01D 5/141; F01D 5/18; F01D 5/225; F05D 2300/133; F05D 2230/312; F05D 2250/291; B33Y 80/00; B33Y 10/00
See application file for complete search history.

(56) References Cited

U.S. PATENT DOCUMENTS 5,038,014 A * 8/1991 Pratt .................... B22F 3/1055
                                                219/121.64
6,099,257 A * 8/2000 Schilling ................ F01D 5/147
                                                416/223 A (Continued)

OTHER PUBLICATIONS

EP search report for 19162627.4 dated Sep. 11, 2019.

*Primary Examiner* — Lawrence Averick
(74) *Attorney, Agent, or Firm* — Getz Balich LLC (57) ABSTRACT

A method of producing a gas turbine engine fan blade having a geometric configuration is provided. The method includes: plastically deforming an initial substrate comprised of a first metallic material into a formed substrate; depositing a second metallic material onto the formed substrate using an additive manufacturing process to produce a blade blank, which depositing includes: additively depositing second metallic material to at least one of the first face surface or the second face surface of the formed substrate adjacent the first end surface, to form a root portion; additively depositing second metallic material to at least one of the first face surface or the second face surface of the formed substrate between the root portion and the second end surface to form an airfoil portion; and shaping the blade blank into the geometric configuration.

15 Claims, 4 Drawing Sheets

(51) Int. Cl.
*C23C 4/08* (2016.01)
*F01D 5/28* (2006.01)
*B33Y 80/00* (2015.01)
*B23K 101/04* (2006.01)

(56) References Cited

U.S. PATENT DOCUMENTS

| | | | |
|---|---|---|---|
| 6,190,133 B1 | 2/2001 | Ress, Jr. | |
| 6,422,010 B1* | 7/2002 | Julien | F01D 25/005 60/527 |
| 7,189,064 B2 | 3/2007 | Helder et al. | |
| 8,123,489 B2 | 2/2012 | Udall et al. | |
| 8,678,771 B2* | 3/2014 | Merrill | B23K 20/021 416/241 R |
| 9,481,931 B2 | 11/2016 | Stempfer | |
| 9,896,941 B2 | 2/2018 | Hui et al. | |
| 2008/0253885 A1 | 10/2008 | Foose et al. | |
| 2009/0075101 A1* | 3/2009 | Kulkarni | C23C 28/347 428/457 |
| 2011/0211965 A1 | 9/2011 | Deal et al. | |
| 2012/0301292 A1* | 11/2012 | Deal | F01D 5/147 415/220 |
| 2013/0101761 A1* | 4/2013 | Bunker | F01D 5/288 428/34.1 |
| 2013/0195333 A1* | 8/2013 | Singh | G03F 7/0035 382/131 |
| 2014/0170435 A1* | 6/2014 | Hui | F01D 5/282 428/613 |
| 2015/0322799 A1 | 11/2015 | Xu | |
| 2015/0337664 A1* | 11/2015 | Cosi | F01D 9/02 415/208.1 |
| 2016/0076374 A1* | 3/2016 | Qi | B22F 3/1055 416/229 A |
| 2016/0115820 A1 | 4/2016 | Prentice et al. | |
| 2016/0215627 A1 | 7/2016 | Roberge et al. | |
| 2016/0222796 A1 | 8/2016 | Spangler et al. | |
| 2016/0341045 A1 | 11/2016 | Xu | |
| 2017/0030202 A1 | 2/2017 | Itzel et al. | |
| 2017/0184120 A1 | 6/2017 | Propheter-Hinckley et al. | |
| 2018/0030837 A1 | 2/2018 | Dutta et al. | |

* cited by examiner

METHOD OF PRODUCING A GAS TURBINE ENGINE COMPONENT

BACKGROUND OF THE INVENTION

1. Technical Field

This disclosure relates generally to methods of producing hollow gas turbine engine components and more particularly to methods of producing hollow gas turbine engine components using additive manufacturing processes.

2. Background Information

Historically, some gas turbine engine airfoils (e.g., fan blades, vanes, etc.) have been made from a solid metal (e.g., nickel, aluminum, titanium, or alloys thereof). Such airfoils, particularly large airfoils such as fan blades from a high bypass gas turbine engine, can have significant weight. Some gas turbine engines utilize hollow airfoils that are lighter relative to solid airfoils of similar configuration. Hollow airfoils, while being relatively lighter in weight, can be difficult and expensive to manufacture. For example, in some instances a hollow fan blade may be formed by initially producing a forging. The forging is subsequently formed into a near shape form having a volume significant enough to contain the entire fan blade. A three dimensional geometry representative of the final airfoil geometry may be formed by removing material from the initial forging. In some instances, hollow passages may be formed by "gun drilling" processes. Gun drilling processes tend to be a tedious and inefficient method for removing core material. In other instances, a hollow interior cavity may be formed (e.g., a milled pocket), which interior cavity may be later enclosed by a cover (sometimes referred to as a "sheath") affixed to the airfoil body. These methods of forming a hollow airfoil typically require significant machining, generate a significant amount of waste metal, and require a substantial lead time. In addition, there are geometric limitations to airfoil features that can be achieved by machining processes.

Accordingly, there is a need for a methodology capable of producing three-dimensional hollow bodies, including but not limited to gas turbine engine fan blades and vanes, capable of producing complex shapes in less time and in a cost effective manner.

SUMMARY OF THE DISCLOSURE

According to an aspect of the present disclosure, a method of producing a gas turbine engine fan blade having a geometric configuration is provided. The method includes: plastically deforming an initial substrate comprised of a first metallic material into a formed substrate that has a first face surface, a second face surface, which first face surface is opposite the second face surface, a first end surface and a second end surface, which second end surface is opposite the first end surface; depositing a second metallic material onto the formed substrate using an additive manufacturing process to produce a blade blank, which depositing includes: additively depositing second metallic material to at least one of the first face surface or the second face surface of the formed substrate adjacent the first end surface, to form a root portion; additively depositing second metallic material to at least one of the first face surface or the second face surface of the formed substrate between the root portion and the second end surface to form an airfoil portion; and shaping the blade blank into the geometric configuration of the gas turbine engine fan blade.

According to another aspect of the present disclosure, a method of producing a hollow airfoil having a geometric configuration is provided. The method includes: plastically deforming an initial substrate comprised of a first metallic material into a formed substrate that has a first face surface, a second face surface, which first face surface is opposite the second face surface, a first end surface and a second end surface, which second end surface is opposite the first end surface; depositing a second metallic material on at least one of the first face surface or the second face surface of the formed substrate between the first end surface and the second end surface using an additive manufacturing process; and shaping the blade blank into the geometric configuration of the gas turbine engine fan blade.

In any of the aspects or embodiments described above and herein, the first metallic material and the second metallic material may each comprise titanium.

In any of the aspects or embodiments described above and herein, the step of depositing the second metallic material to form an airfoil portion, may include depositing the second metallic material to define at least one internal cavity.

In any of the aspects or embodiments described above and herein, the step of depositing the second metallic material to form an airfoil portion may include depositing the second metallic material to define a plurality of internal cavities and at least one rib separating adjacent internal cavities.

In any of the aspects or embodiments described above and herein, the step of depositing the second metallic material to form the airfoil portion, may include defining a shelf surface extending around a perimeter of the at least one internal cavity.

In any of the aspects or embodiments described above and herein, the method may include attaching a cover panel to enclose the at least one internal cavity.

In any of the aspects or embodiments described above and herein, the method may include plastically deforming a substrate to form a cover panel, the cover panel configured to mate with a shelf surface.

In any of the aspects or embodiments described above and herein, the step of depositing the second metallic material onto the formed substrate using an additive manufacturing process includes depositing second metallic material to the first face surface of the formed substrate between the root portion and the airfoil portion, and to the second face surface of the formed substrate between the root portion and the airfoil portion to form a platform portion.

In any of the aspects or embodiments described above and herein, the additive manufacturing process may be a plasma arc, wire feed deposition process.

In any of the aspects or embodiments described above and herein, the step of plastically deforming the initial substrate may include hot forming the initial substrate.

In any of the aspects or embodiments described above and herein, at least a portion of the first face surface of the formed substrate may have a convex configuration, and at least a portion of the second face surface of the formed substrate may have a concave configuration.

In any of the aspects or embodiments described above and herein, the step of shaping the blade blank into the geometric configuration of the gas turbine engine fan blade includes producing a leading edge, a trailing edge, and a blade tip surface extending between the leading edge and the trailing edge.

The foregoing features and the operation of the present disclosure will become more apparent in light of the following description and the accompanying drawings.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In the disclosure that follows certain relative positional terms are used such as "forward", "aft", "upper", "lower", "above", "below", "inner", "outer" and the like. These terms are used with reference to the normal operational attitude of a gas turbine engine and should not be considered otherwise limiting. The forward end of a gas turbine engine generally refers to the axial end of the engine where air is drawn into the engine, and the aft end of the engine generally refers to the opposite axial end where air and other products are expelled from the engine. When referring to an airfoil (e.g., a fan blade), the term "leading edge" generally means the upstream edge of the airfoil, and the term "trailing edge" generally means the downstream edge of the airfoil. The term "radially outward" as used herein generally refers to a direction extending away from the axially extending engine center axis, and the term "radially inward" refers to a direction extending toward the engine center axis.

Figure 1:
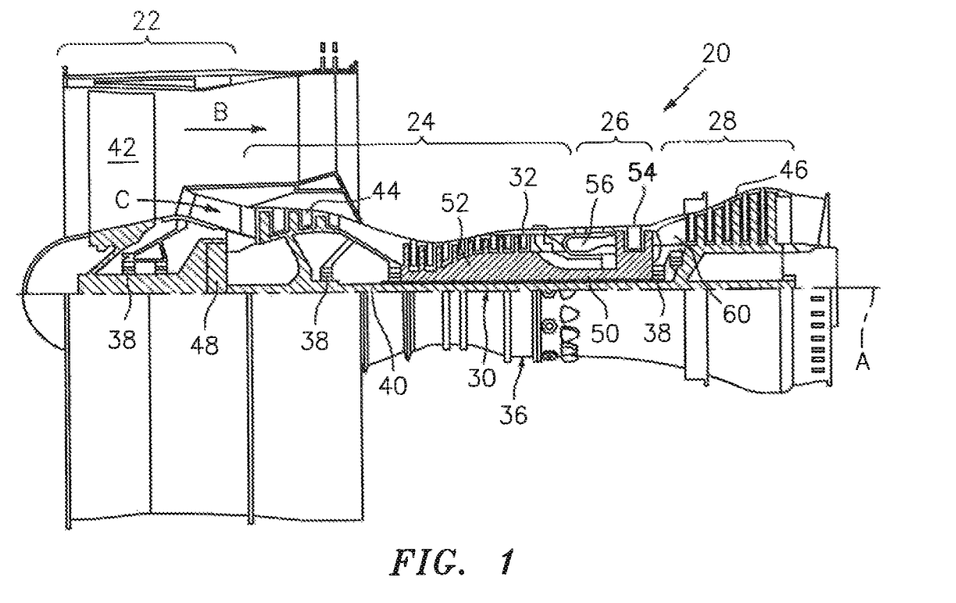
FIG. 1 is a diagrammatic partially sectioned view of a gas turbine engine.

Referring now to the FIG. 1, to facilitate the description of the present disclosure a two-spool turbofan type gas turbine engine 20 is shown. This exemplary embodiment of a gas turbine engine includes a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis A relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

The present disclosure is directed to a method of manufacturing a three-dimensional component (e.g., a gas turbine engine rotor blade such as a fan blade, a guide vane, struts, gas path component, etc.) and to the components themselves. To simplify the description, the present disclosure will be described in terms of a gas turbine engine fan blade. The present disclosure is not, however, limited to methods for manufacturing gas turbine engine fan blades.

Figure 6:
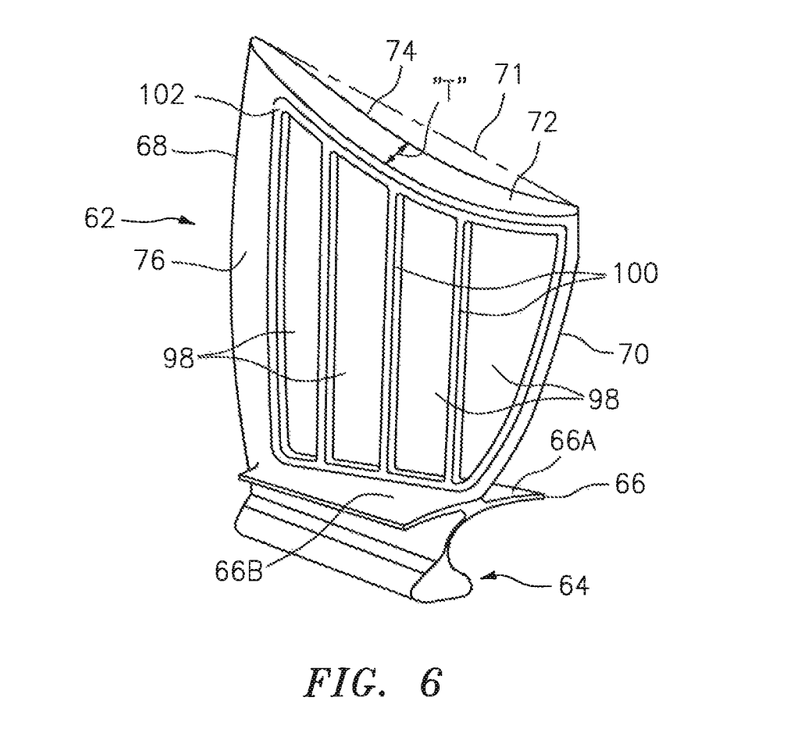
FIG. 6 is a perspective view of fan blade blank (e.g., such as that shown in FIG. 5) now shaped to a gas turbine engine fan blade geometry.
Figure 7:
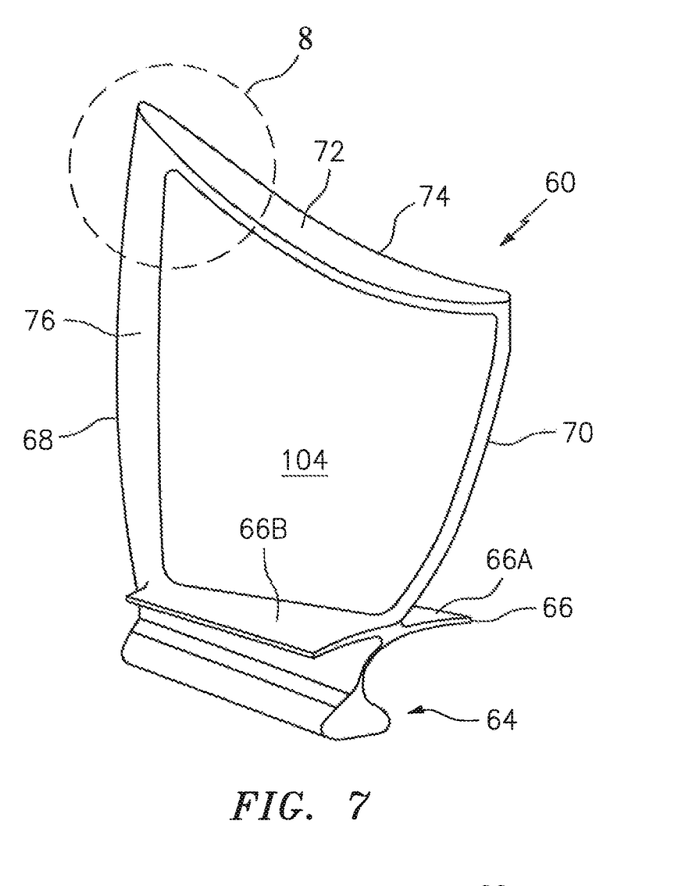
FIG. 7 is a view of the fan blade blank shown in FIG. 6, including a cover enclosing an internal cavity.

Referring to FIGS. 6 and 7, a typical gas turbine engine fan blade 60 includes an airfoil portion 62 and a root portion 64. In some embodiments, a fan blade 60 may include a platform 66 disposed between the airfoil portion 62 and the root portion 64. The airfoil portion 62 may be described as having a leading edge 68, a trailing edge 70, a blade tip surface 72, a concave side surface 74 extending from the leading edge 68 to the trailing edge 70, and a convex side surface 76 extending from the leading edge 68 to the trailing edge 70. The airfoil portion 62 may be described as having a chord, which chord is defined by a line 71 that extends between the leading edge 68 and the trailing edge 70 in the direction of the airflow traveling past the airfoil during operation of the engine. The length of the chord may vary at different radial positions of the fan blade. The airfoil portion 62 may also be described as having a thickness "T" (e.g., see FIG. 6), which dimension generally refers to the distance between the concave side 74 surface and the convex side surface 76 of the airfoil portion 62. In some conventions, the thickness is measured along a line extending perpendicular to the camber line of the airfoil portion 62, and in other conventions the thickness is measured along a line extending perpendicular to the chord line of the airfoil portion 62. The thickness of the airfoil portion 62 typically varies between the leading edge 68 and the trailing edge 70; e.g., the thickness is greater in the central region of the airfoil portion 62 between the leading edge 68 and the trailing edge 70. The thickness of the airfoil portion 62 also typically varies along a direction extending from the blade tip surface 72 and the root portion 64; e.g., the thickness may be lesser adjacent the blade tip surface.

Each root portion 64 is configured to be received in a mating void (sometimes referred to as a "groove" or "slot"—not shown) disposed in a hub configured to be rotated about an axially extending centerline; e.g. the axial centerline of the engine. In a geared turbofan engine, the axial centerline of the fan section of the engine may be displaced from the axial centerline of other sections of the engine; e.g., the compressor section and/or the turbine section. The mating configuration between the root portion 64 and respective void maintains the connection between the respective fan blade and the hub as the hub rotates. The root portion 64 may have a variety of different configurations; e.g., a "dovetail" configuration, a "fir tree" configuration, etc. The present disclosure is not limited to any particular root portion configuration. The root portion 64 may be solid or may be hollow (e.g., have one or more interior cavities).

In those fan blade embodiments that include a platform 66, the platform 66 typically includes a first side portion 66A that extends generally circumferentially outwardly from one side of the fan blade 60 (e.g., circumferentially outwardly from the concave side surface), and a second side portion 66B that extends generally circumferentially outwardly from the opposite side of the fan blade (e.g., circumferentially outwardly from the convex side surface). Collectively, the fan blade platforms 66 within a fan blade stage collectively form a radially inward gas path surface.

An aspect of the present disclosure includes a method of manufacturing a hollow component, which component is described hereinafter as a hollow fan blade. As indicated above, however, the present method may be used to produce a variety of different components and is not limited to making hollow fan blades.

Figure 2:
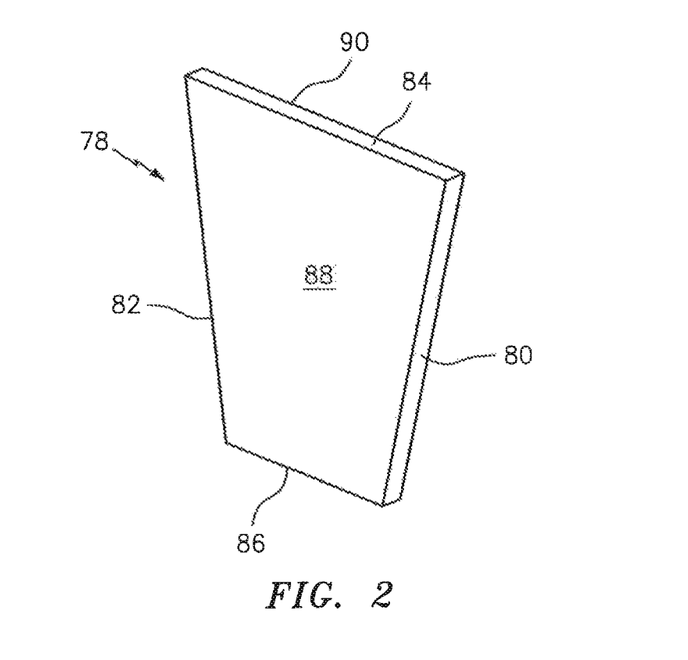
FIG. 2 is a perspective view of an initial substrate embodiment.

Referring to FIG. 2, the present method includes providing an initial substrate 78. The geometry of the initial substrate 78 may vary depending on the particular component being manufactured, and the present method is not limited to initial substrates 78 having any particular geometry. For example, the initial substrate 78 shown in FIG. 2 is configured for manufacturing a gas turbine engine fan blade 60 and has a six-sided geometry; e.g., a first heightwise edge surface 80, a second heightwise edge surface 82, a first widthwise edge surface 84, a second widthwise edge surface 86, a first face surface 88, and a second face surface 90. The first heightwise edge surface 80 is opposite the second heightwise edge surface 82. The first widthwise edge surface 84 is opposite the second widthwise edge surface 86. The first face surface 88 is opposite the second face surface 90. The initial substrate 78 shown in FIG. 2 is also shown as having a substantially uniform thickness; e,g, the distance between the face surfaces is substantially uniform. As indicated above, the initial substrate 78 may assume a variety of different configurations, and therefore is not limited to the initial substrate geometry shown in FIG. 2; e.g., the initial substrate 78 may have a geometry other than a six-sided geometry, it may have a variable thickness, etc.

The material properties (e.g., type of material, metallurgical properties, etc.) of the initial substrate 78 may depend on the particular component being manufactured, and the operating environment in which the component is designed to operate (e.g., thermal, loading, stress environments etc.) For performance and durability, the operating environment of a component may dictate that certain materials are preferred over other materials. In terms of a fan blade for a gas turbine engine, the initial substrate 78 may for example comprise a titanium alloy or aluminum alloy. In terms of a turbine exhaust guide vane, which has a much higher temperature operating environment, the initial substrate 78 may, for example, comprise a nickel alloy.

In some applications, the initial substrate 78 may be subjected to a forming process that plastically deforms the initial substrate into a predetermined three-dimensional geometry (referred to hereinafter as a "formed substrate 92"). For example, when the present method is used to manufacture a fan blade, the initial substrate 78 may be formed (i.e., plastically deformed) to create a formed substrate 92 having a concave side and a convex side, with a predetermined twist that will affect the camber and chord lines of the finished airfoil portion 62 of the fan blade 60. The amount of predetermined twist may vary along the radial extent of the airfoil portion 62. A variety of different processes may be used to form (plastically deform) the initial substrate 78, and the present method is not limited to any particular forming process.

Figure 3:
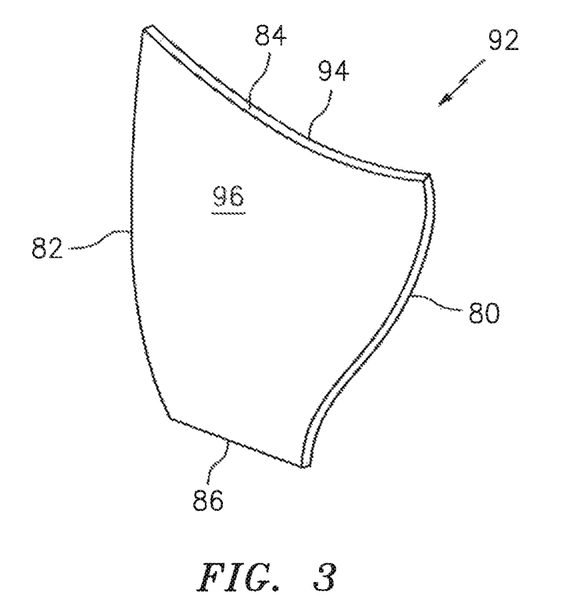
FIG. 3 is a perspective view of an initial substrate plastically deformed into a formed substrate.

An example of an acceptable forming process is a "hot forming" process wherein the initial substrate 78 is heated to an elevated temperature that will facilitate plastic deformation of the initial substrate 78. The heated initial substrate 78 may be subsequently placed in a forming press (e.g., with dies configured to create the desired geometry) and an adequate amount of force applied to cause the plastic deformation of the initial substrate 78. The initial substrate is subsequently cooled and thereafter retains its formed geometry; i.e., it is the "formed substrate 92"; e.g., see FIG. 3. As stated above, a variety of forming processes may be used, and acceptable forming processes may vary depending on the type of material comprising the initial substrate, the geometry of the formed substrate 92, etc.

The formed substrate 92 is subsequently subjected to an additive manufacturing process wherein a material compatible with the material of the formed substrate 92 (e.g., the same type of material) is added to regions of the formed substrate 92. In general terms, additive manufacturing techniques involve successively added layers of material to a substrate. Some additive manufacturing processes use energy from an electron beam or a laser beam to melt and deposit a feed stock (e.g., a wire or a powder flow). Other additive manufacturing processes used a plasma arc to melt and deposit a feed stock (e.g., a wire or a powder flow). The present disclosure is not limited to any particular type of additive manufacturing process. An example of an acceptable additive manufacturing process is one that uses a plasma arc and a wire feed stock. In many instances, it is desirable to have the material added during the additive manufacturing process be the same as, or nearly the same as, the material comprising the formed substrate. For example, in the example of manufacturing a titanium fan blade, the formed substrate may be a titanium alloy and the feed stock being additively deposited on the formed substrate during the additive manufacturing process may be the same titanium alloy, or a compatible titanium alloy.

Two specific examples of acceptable additive manufacturing processes that utilize a plasma arc and a wire feed stock are disclosed in U.S. Pat. Nos. 9,481,931 and 9,346,116, both of which are issued to Norsk Titanium AS of Norway, and each of which is hereby incorporated by reference in its entirety. The '931 patent is directed to a "Method and Arrangement for Building Metallic Objects by Solid Freeform Fabrication", and discloses a device that includes a welding torch with an integrated wire feeder, a system for positioning and moving a substrate relative to the welding torch, and a control system operable to utilize a computer assisted design (CAD) model to regulate the position and movement of the substrate relative to the welding torch. The '931 patent further discloses that the welding torch may comprise first and second plasma transferred arc (PTA) torches, each configured to heat and excite a stream of inert gas to a plasma plume extending out from a nozzle. The thermal energy from the plasma plumes creates a molten pool of substrate material and melted feed stock for deposition on the substrate. In terms of methodology, the '931 patent discloses the steps of: a) employing a holding substrate made of a similar metallic material as the object is to be made of, and each successive deposit is obtained by; i) employing a first plasma transferred arc (PTA) to preheat and form a molten pool in the base material at the position at which the metallic material is to be deposited, ii) feeding the metallic material to be deposited in the form of a wire to a position above the molten pool, iii) employing a second plasma transferred arc (PTA) to heat and melt the wire such that molten metallic material is dripping into the molten pool, and iv) moving the holding substrate relative to the position of the first and second PTA in a predetermined pattern such that the successive deposits of molten metallic material solidifies and forms the three-dimensional object. The '931 patent discloses further that the methodology may be automated using a system for positioning and moving the holding substrate relative to the welding torch, and a control system able to read a computer assisted design (CAD) model of the object which is to be formed and employ the CAD-model to regulate the position and movement of the system for positioning and moving the holding substrate and to operate the welding torch with integrated wire feeder such that a physical object is built by fusing successive deposits of the metallic material onto the holding substrate. The '116 patent is directed to a "Method and Device for Manufacturing Titanium Objects". The devices and methodologies disclosed in these patents are non-limiting examples of acceptable additive manufacturing processes.

Figure 4:
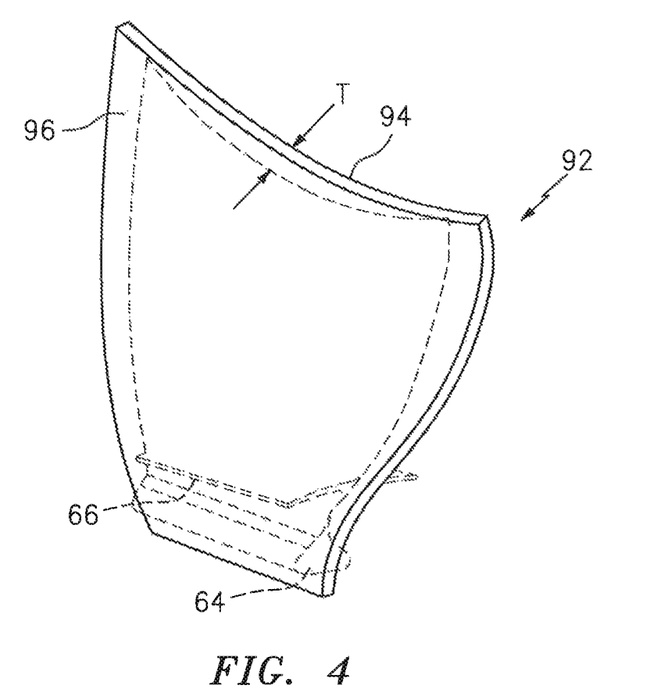
FIG. 4 is a perspective view of a formed substrate including a gas turbine engine fan blade embodiment shown in dashed line.

FIG. 4 shows a formed substrate 92 shaped for use in the process of manufacturing a fan blade 60. FIG. 4 also includes an exemplary fan blade geometry shown in dotted line relative to the formed substrate 92 to illustrate geometric differences between the formed substrate 92 and the exemplary fan blade geometry. The exemplary fan blade includes a platform 66 and a root portion 64, and includes an airfoil thickness "T" in certain regions that greater than the thickness of the formed substrate. FIGS. 4-7 depict a fan blade that includes a platform 66. As stated above, not all fan blades that may be manufactured according to the present disclosure include a platform 66.

Figure 5:
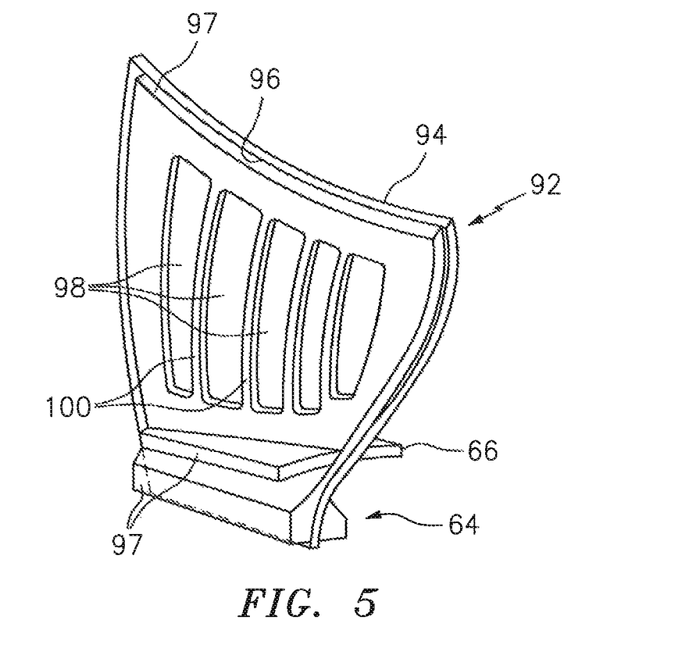
FIG. 5 is a perspective view of a fan blade blank illustrating material deposited on a formed substrate using an additive manufacturing process prior to shaping.

FIG. 5 shows a formed substrate 92 having a concave side surface 94 and a convex side surface 96. Additive material 97 is deposited on the formed substrate 92 on both the concave side surface 94 and the convex side surface 96 in sufficient amount to generally form a platform 66 and a root portion 64. Additional additive material 97 is deposited on a portion of the convex side surface 96 of the formed substrate 92 above the platform 66 to increase the thickness of the formed substrate 92. In alternative embodiments, additive material 97 may be deposited solely on a portion of the concave side surface 94, or on both the convex and concave side surfaces 94, 96 of the formed substrate 92. In some applications, it may be possible to transform the initial substrate 78 to a formed substrate 92 that has one or more surfaces that have a final geometry. In these applications, it may be possible to avoid forming (e.g., machining) or the need to add additive material 97 to the surfaces having the final geometry, thereby increasing the efficiency of the manufacturing process; e.g., the manufacturer only needs to add additive material 97 to the concave side or the convex side to produce a hollow airfoil. In some instances, additive material 97 may be deposited in a manner so that a solid fan blade (e.g., no internal voids) may be produced. In other instances, additive material 97 may be deposited in a manner to create a structure with internal elements; e.g., one or more internal structural elements, cavities, etc. Depositing additive material in this manner decreases (or possibly eliminates) the need for subsequent manufacturing processes (e.g., machining) required to arrive at a final geometry. Decreasing or eliminating the need for subsequent manufacturing processes can speed up component production and decrease the overall cost of component production. In the particular embodiment shown in FIG. 5, the additive material 97 is deposited in a manner that creates a plurality of cavities 98, each separated from one or more of the others by a structural element such as a rib 100. The additive material process permits a variety of different geometries to be built up on the formed substrate 92, including geometries that are not practically possible using conventional hollow airfoil techniques.

Figure 8:
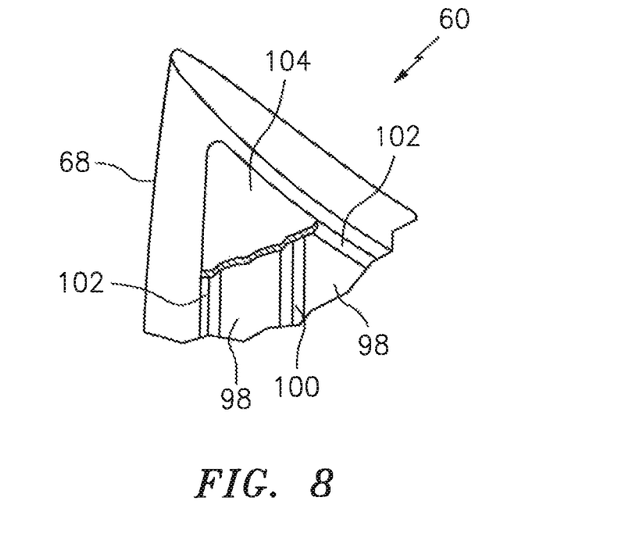
FIG. 8 is a partial view of the fan blade blank shown in FIG. 7 with a portion of the cover sectioned.

The formed substrate 92 with the deposited additive material 97, which is a unitary body, may be referred to as a "component blank" or a "blade blank". The component blank may be altered (e.g., machined, or otherwise formed) to a finished geometry that requires no further geometric alteration, or to a semi-finished geometry that generally reflects the finished geometry of component (e.g., the fan blade). For example, a component blank, as described above and shown in FIG. 5, may be subjected to one or more machining processes to shape the component blank into the desired component geometry. FIG. 6, for example, shows a component blank machined into a substantially finished fan blade geometry; e.g., portions of the additive material 97 and the formed substrate 92 (see FIG. 5) were shaped to form an aerodynamic airfoil portion 62 of a fan blade, the airfoil portion 62 having a leading edge 68, a trailing edge 70, a convex side surface 76, a concave side surface 74, a blade tip surface 72, and internal features (e.g., cavities 98 and ribs 100). In addition, the component blank was machined to form the fan blade root portion 64 and the fan blade platform 66, extending out circumferentially from each respective side surface of the fan blade 60. In some instances (e.g., as shown in FIGS. 6-8), the formation process includes the creation of a shelf surface 102 extending around the perimeter of the interior features 98, 100 to permit the attachment of a cover panel 104 (as described below) to enclose the interior features 98, 100. Referring to FIG. 8, the shelf 102 may have a depth approximately equal to the thickness of the cover panel 104 and a width adequate to support the cover panel 104 around the perimeter of the interior features 98, 100.

The present disclosure is not limited to any particular order or process for forming a component blank into a substantially finished component; e.g., a substantially finished fan blade. Indeed, the particular order of forming a component blank into a substantially finished component may vary depending on the component being manufactured. For example, in some instances the forming processes (e.g., machining) used to substantially finish the airfoil portion 62 of a fan blade 60 may have a higher error rejection rate than the forming processes of other portions of the fan blade; e.g., the root or platform portions 64, 66. In such instances, the airfoil portion 62 may be formed before other portions and inspected for defects. If an insurmountable defect is produced during the airfoil formation process, the partially formed fan blade may be scrapped. On the other hand if no defects are incurred during the airfoil formation process, the remaining portions of the fan blade may be formed.

As indicated above, the fan blade embodiment shown in FIGS. 6-8 is a "hollow" fan blade having an airfoil portion 62 that includes interior features such as one or more cavities 98 and structural elements (e.g., ribs 100). The present disclosure is not limited to a hollow fan blades 60, and also is also not limited to hollow fan blade configurations having internal cavities 98 and ribs 100 as shown in the FIGURES. In those fan blade embodiments that include internal features (e.g., cavities 98 and ribs 100), the interior of the fan blade may be enclosed by affixing a cover panel 104 to the airfoil portion 62. The cover panel 104 may be formed to have a geometry that matches the geometry of the airfoil portion surface to which it is attached. For example in FIG. 7, a cover panel 104 is shown affixed to the convex side 76 of the airfoil portion 62 of the fan blade 60. The cover panel 104 is formed to assume the geometry of the convex side surface 76; e.g., to make an uninterrupted, continuous convex side surface. The material comprising the cover panel 104 may vary depending on the particular component formed. In terms of a gas turbine fan blade application, the cover panel 104 may be formed from the same material or a similar material as that of the formed fan blade 60; e.g., a titanium cover panel 104 may be used to enclose the internal region of a titanium fan blade 60. Alternatively, the cover panel 104 may be a composite material. The means by which the cover panel 104 is attached may also vary depending upon the particular component and the materials thereof. In the given example of a titanium fan blade 60 with a titanium cover panel 104, the cover panel 104 may be attached by conventional means such as welding, brazing, diffusion bonding, etc. In some instances, a cover panel 104 (e.g., a composite material cover panel) may be adhered (e.g., glued) to the airfoil portion 62. In some instances, the cover panel 104 may be attached to a formed fan blade 60 at a point in time where the fan blade (e.g., the airfoil portion 62) has been substantially, but not finally, formed. During the final formation processes (e.g., machining), to the extent that the cover panel attachment creates surface anomalies (e.g., weld protrusions, etc.), the final processing can address those anomalies to produce the desired surface contour.

In some instances, the present disclosure may include additional steps in the manufacturing of a component. For example, in some instances the blade blank shape into the geometric configuration of the gas turbine engine fan may be heat treated to create desirable metallurgical properties, and/or may be subjected to "surface finishing" processes that produce a desirable surface finish. The present method does not require these additional steps or others.

What is claimed is:

1. A method of producing a gas turbine engine fan blade having a geometric configuration,
   the method comprising:
   plastically deforming an initial substrate comprised of a first metallic material into a formed substrate that has a first face surface,
   a second face surface,
   the first face surface is opposite the second face surface,
   a first end surface and a second end surface,
   the second end surface is opposite the first end surface; and depositing a second metallic material onto the formed substrate using an additive manufacturing process to produce a fan blade blank,
   the depositing including:
   depositing the second metallic material onto at least one of the first face surface or the second face surface of the formed substrate adjacent the first end surface, to form a fan blade root portion;
   depositing the second metallic material onto at least one of the first face surface or the second face surface of the formed substrate between the fan blade root portion and the second end surface to form a fan blade airfoil portion; and
   shaping the fan blade blank into the geometric configuration of the gas turbine engine fan blade.

2. The method of claim 1, wherein the first metallic material and the second metallic material each comprise titanium.

3. The method of claim 2,
   wherein the step of depositing the second metallic material onto the formed substrate to form the fan blade airfoil portion,
   includes depositing the second metallic material to define at least one internal cavity.

4. The method of claim 3, wherein the depositing the second metallic material to define at least one open internal cavity includes defining a plurality of internal cavities and at least one rib separating adjacent internal cavities.

5. The method of claim 4, wherein the step of depositing the second metallic material to form the fan blade airfoil portion, includes defining a shelf surface extending around a perimeter of the at least one internal cavity.

6. The method of claim 5, further comprising attaching a cover panel to enclose the at least one open internal cavity.

7. The method of claim 6, further comprising plastically deforming a substrate to form the cover panel, the cover panel configured to mate with the shelf surface.

8. The method of claim 1, wherein the additive manufacturing process is a plasma arc, wire feed deposition process.

9. The method of claim 1, wherein the step of plastically deforming the initial substrate includes hot forming the initial substrate.

10. The method of claim 1, wherein at least a portion of the first face surface of the formed substrate has a convex configuration, and at least a portion of the second face surface of the formed substrate has a concave configuration.

11. The method of claim 1, wherein the step of shaping the blade blank into the geometric configuration of the gas turbine engine fan blade includes producing a leading edge, a trailing edge, and a blade tip surface extending between the leading edge and the trailing edge.

12. The method of claim 1, wherein the step of plastically deforming the initial substrate includes plastically deforming the initial substrate so that at least a portion of the first face surface of the formed substrate has a convex configuration, and at least a portion of the second face surface of the formed substrate has a concave configuration.

13. The method of claim 1, wherein the initial substrate is a planar body.

14. The method of claim 1, wherein the step of plastically deforming an initial substrate into a formed substrate includes plastically deforming the initial substrate such that at least a portion of the formed substrate has a twist.

15. A method of producing a gas turbine engine fan blade having a geometric configuration, the method comprising:

plastically deforming an initial substrate comprised of a first metallic material into a formed substrate that has a first face surface, a second face surface, the first face surface is opposite the second face surface, a first end surface and a second end surface, the second end surface is opposite is opposite the first end surface; and depositing a second metallic material onto the formed substrate using an additive manufacturing process to produce a blank, the depositing including:

depositing the second metallic material onto at least one of the first face surface or the second face surface of the formed substrate adjacent the first end surface, to form a root portion;

depositing the second metallic material onto at least one of the first face surface or the second face surface to form an airfoil portion:

depositing the second metallic material onto at least one of the first face surface or the second face surface of the formed substrate between the root portion and the second end surface to form an airfoil portion;

depositing the second metallic material onto the first face surface of the formed substrate between the root portion and the airfoil portion, and to the second face surface of the formed substrate between the root portion and the airfoil portion to form a platform portion; and shaping the blade blank into the geometric configuration of the gas turbine engine fan blade.

* * * * *

UNITED STATES PATENT AND TRADEMARK OFFICE
CERTIFICATE OF CORRECTION

PATENT NO. : 10,793,943 B2
APPLICATION NO. : 15/922230
DATED : October 6, 2020
INVENTOR(S) : Eric Malmborg Page 1 of 1

It is certified that error appears in the above-identified patent and that said Letters Patent is hereby corrected as shown below:

In the Claims

Column 12, Line 8, please delete "blank" and insert --blade blank--

Signed and Sealed this
Tenth Day of November, 2020

Andrei Iancu
*Director of the United States Patent and Trademark Office*